Jan. 22, 1924.　　　　　　　　　　　　　　1,481,688
J. W. CARNAHAN
GLASS DELIVERING APPARATUS
Filed July 26, 1919　　　3 Sheets-Sheet 3
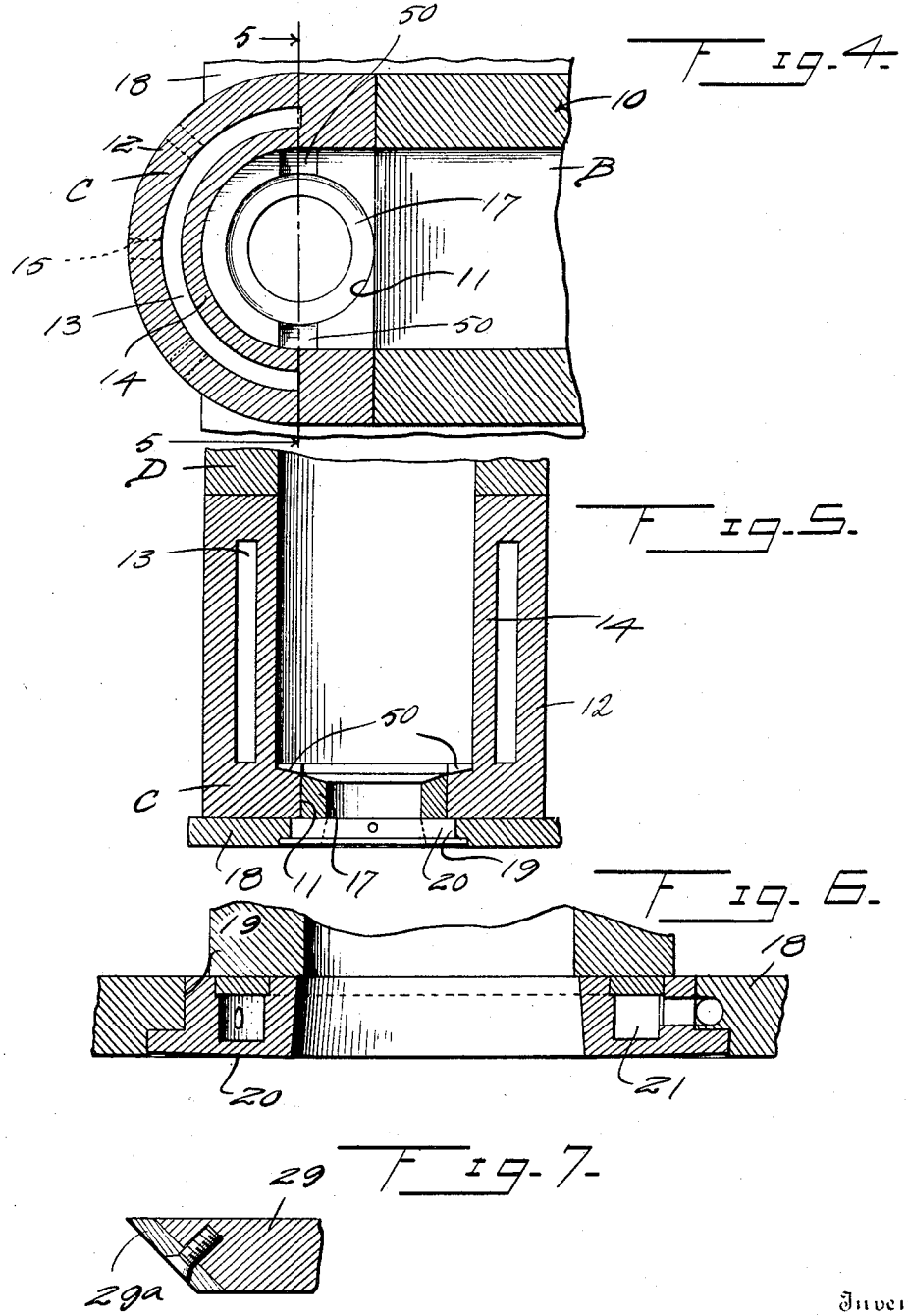
Inventor
J.W. Carnahan
By Watson E. Coleman
Attorney Patented Jan. 22, 1924.

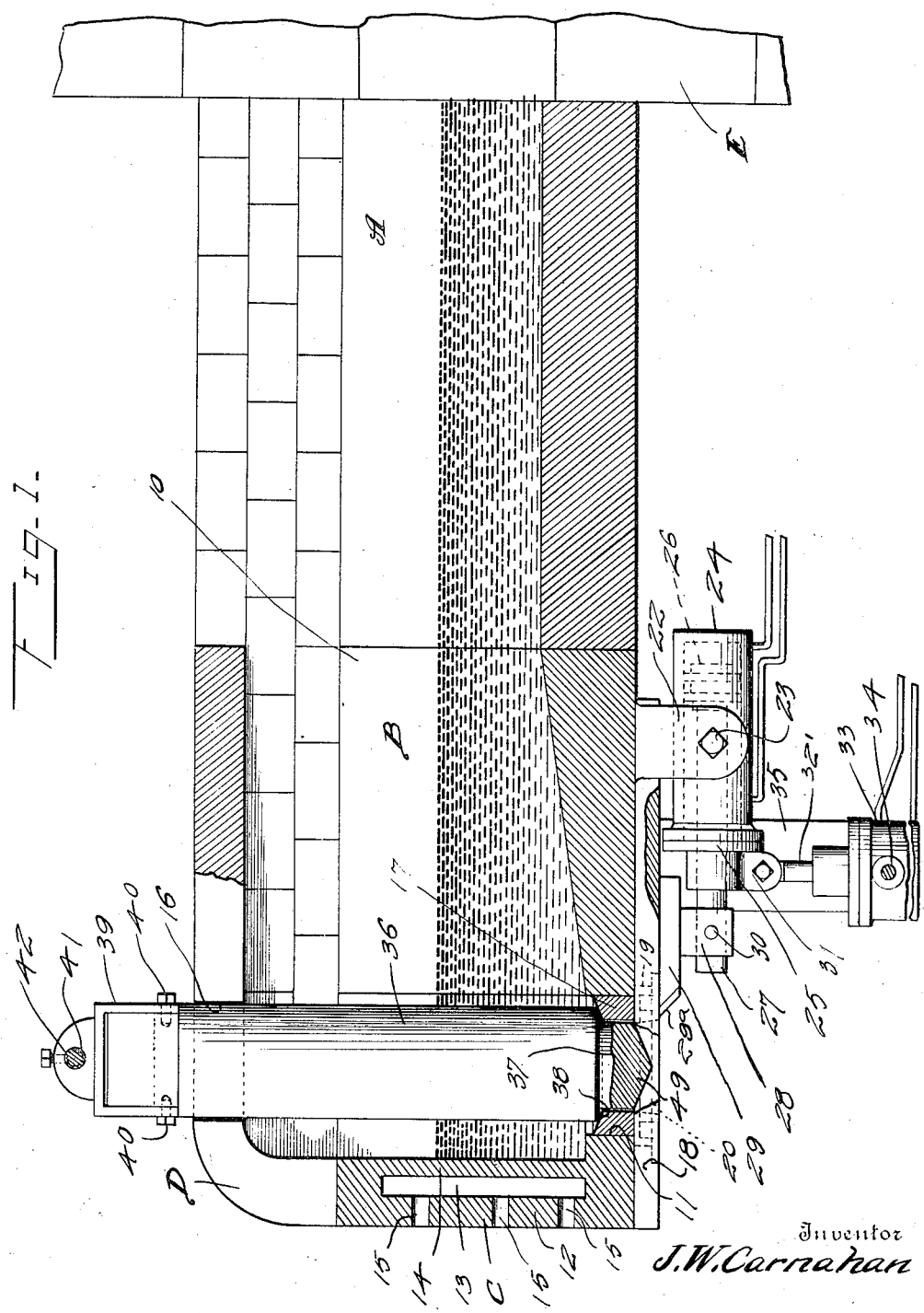

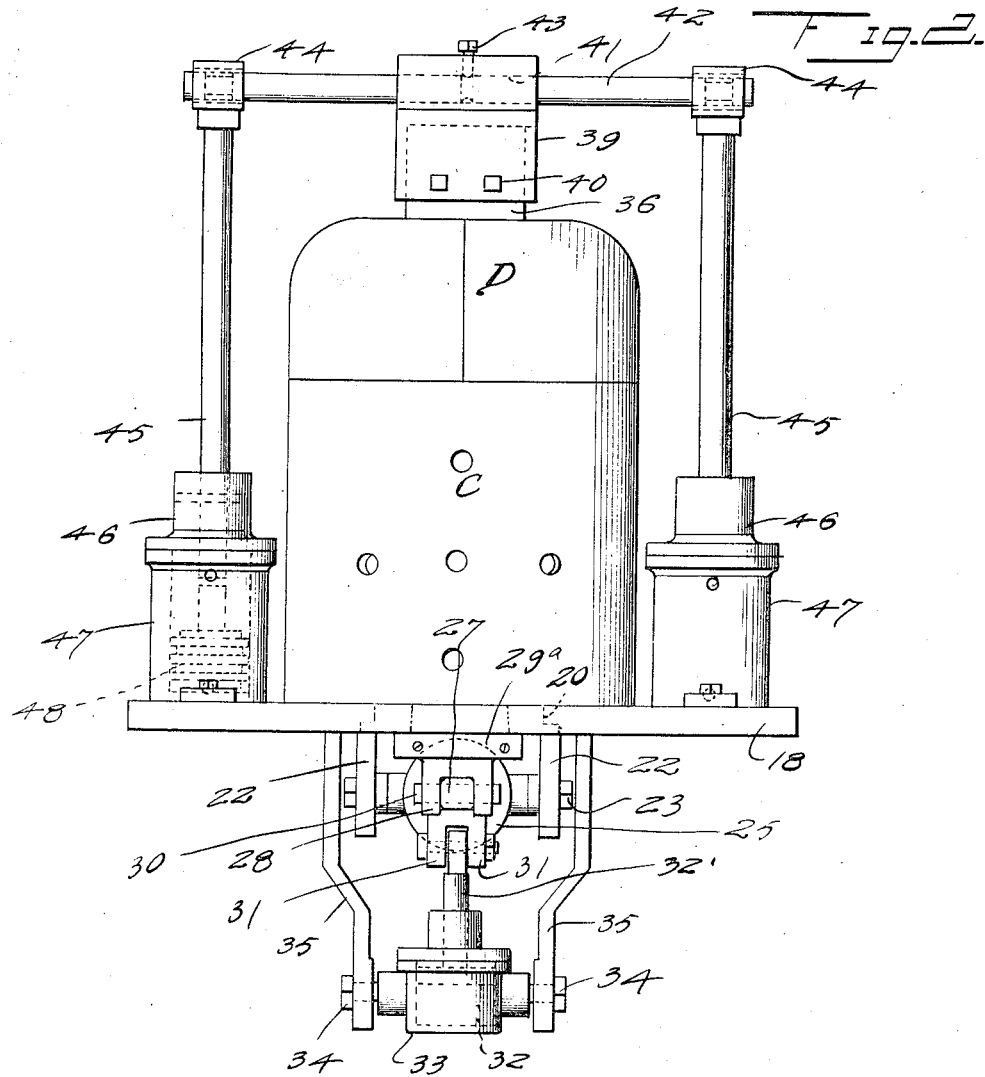

1,481,688

UNITED STATES PATENT OFFICE.

JOHN W. CARNAHAN, OF BLACKWELL, OKLAHOMA.

GLASS-DELIVERING APPARATUS.

Application filed July 26, 1919. Serial No. 313,516.

*To all whom it may concern:*

Be it known that I, JOHN W. CARNAHAN, a citizen of the United States, residing at Blackwell, in the county of Kay and State of Oklahoma, have invented certain new and useful Improvements in Glass-Delivering Apparatus, of which the following is a specification, reference being had to the accompanying drawings.

This invention relates to glass furnaces, and particularly to delivering mechanism disposed on the snout of the furnace for the purpose of causing the delivery of a certain, predetermined quantity of molten glass from the snout, and for the purpose of cutting off the glass after this amount has been discharged.

The general object of my invention is to provide improved means for permitting the molten glass to flow from the snout and cutting it off, and in this connection to provide a vertically reciprocatable plug for this purpose, which plug is made of clay or like material and which, when raised, permits a certain amount of glass to flow into the space beneath the plug, and which, when lowered, will expel this glass from the snout and cut off any further flow of glass.

Another object is to provide improved means for raising and lowering this plug, this means being preferably operated by compressed air or other motive pressure fluid.

Still another object is to provide a knife which is disposed beneath the opening in the snout and reciprocatable under power across said opening to cut off the glass.

A further object is to provide a knife so mounted that upon an initial movement it will shift across said opening at right angles to the axis thereof and immediately beneath the snout to cut off the glass, then drop downward and then move to its retracted and initial position in order to prevent the knife from leaving any chill marks on the glass and to keep the molten glass from chilling to a degree which will prevent it from being forced through the snout opening.

A further object is to provide a knife which will also shift as described, and which is capable of being used where a pocket is to be formed in the knife and the glass forced into the same in order to shape the glass.

A further object is to improve the details of construction and arrangement of parts in a glass delivering apparatus of this character, as will appear hereafter.

My invention is illustrated in the accompanying drawings, wherein:—

Figure 1 is a longitudinal sectional view of a glass furnace snout with my improvements applied thereto;

Figure 2 is an end elevation of the furnace and the knife operating mechanism;

Figure 3 is a fragmentary side elevation of the knife operating mechanism, showing the knife in its lowered position;

Figure 4 is a fragmentary horizontal longitudinal section of the forward end of the snout;

Figure 5 is a section on the line 5—5 of Figure 4;

Figure 6 is a fragmentary section of the snout and the water cooled ring;

Figure 7 is a fragmentary sectional view through the knife;

Referring particularly to Figures 1 to 5, 10 designates the snout of the glass furnace, which snout is made of sections of clay. One of these sections A is U-shaped in form and open at the top, the next section B being also channelled or U-shaped in form, and the third section C forms the end of the snout and is transversely rounded, as illustrated in Figure 4, and provided with an opening 11 in its bottom. The wall 12 is formed with an arcuate chamber 13 so as to provide an inner baffle wall 14, and the outer wall is provided with ports 15 whereby heating jets may discharge against the wall 14 to keep the glass within the snout in a molten condition. Resting upon the sections B and C is a section D, which is also made of clay, and which is transversely rounded or arched, and which is formed with an opening 16 for the passage of a plunger, as will be later stated.

Disposed within the opening 11 is a bushing 17, which is made of clay, and which rests upon a metallic plate 18 which forms a base plate for the support of the knife, as will be later described. This metallic plate is formed with an opening 19, within which is disposed a hollow, annular, water cooled plate or bushing 20 formed with a downwardly flaring, central aperture, and having its under face ground and formed with an annular water chamber 21, connected by ports to means for forcing cold water into the chamber 21 and causing it to circulate through the chamber to thereby keep this ring 20 cool. I do not wish to be limited to any particular construction for this cooling ring, but it should be made of hardened tool steel, as it is against the under face of this ring that the knife operates.

The plate 18 is attached to the under face of the snout 10 in any suitable manner, and is provided with the opening 19, as before stated, and extends rearward toward the tank E, and at its rear end is provided with downwardly turned ears 22. Pivoted between these ears by retaining bolts 23 is a compressed air cylinder 24, having the usual stuffing box 25 at its end and having therein a piston 26 carrying a piston rod 27 which, at its extremity, is embraced by ears 28 extending downward from the knife 29. This rod 27 is pivoted to the ears by a transverse bolt 30. Thus, when the piston moves outward the knife will move with it, but the knife has a certain amount of play on the piston rod. The stuffing box 25 has the ears 31 extending downward from it, connected to a piston 32 operating within the cylinder 33, this cylinder being mounted on retaining bolts 34, these in turn being rotatably mounted in downwardly extending, relatively long ears 35 extending from the plate 18.

It will be obvious now that if compressed air be admitted to the cylinder 24 behind the piston 26, the knife 29 will be carried forward, and that if air be admitted beneath the piston within the cylinder 33, the knife will be pressed upward against the under side of the plate 18 or against the cooling ring mounted therein. After the knife has completed its stroke, if air be released from beneath the piston or if air be admitted on top of the piston in cylinder 33, the knife will drop to the position shown in Figure 3, and then upon the admission of air in front of the piston in cylinder 24, the knife will be retracted and may be again raised to its initial position by admitting air beneath the piston in cylinder 33.

Disposed within the snout is a plunger 36, which is made of clay or like material, and extends out through the opening 16. The lower end of this plunger is reduced in diameter, at 37, so that its exterior diameter at this point is very slightly smaller than the interior diameter of the bushing 17, thus providing a shoulder 38 which rests upon the upwardly and outwardly flaring upper face of the bushing 17 when the plunger is forced downward to its full extent. The upper end of the plunger 36 is carried within a metallic cap 39 which embraces the reduced upper end of the plunger and which is held engaged with the plunger by means of the screws 40. This cap 39 at its upper end is provided with a transverse aperture 41 designed to receive a transversely extending shaft 42, the middle of this shaft being grooved for engagement by a screw 43 passing through the cap, thus locking this cap and the plunger from transverse movement on this shaft. The shaft 42 at its ends is also grooved and is adapted to be rotatably mounted in bearings in the heads 44 which, in turn, are carried upon the vertically extending piston rods 45. These piston rods 45 pass through suitable stuffing boxes 46 carried on the upper ends of the cylinders 47. Two of these cylinders 47 are disposed one on each side of the snout and rest on the lateral extensions of the plate 18 and are bolted thereto. The piston rods 45 carry pistons 48, operating in the cylinders. Each cylinder is provided at its upper and lower end with a port whereby steam, compressed air, or other motive fluid may be admitted to the cylinder to force the pistons down or up. Of course, suitable valves are provided for controlling the flow of motive fluid.

It is to be noted that the lower end of the plunger 36 is conical, as at 49, the point of the cone extending out through the clay bushing about ¾" when down to cause the glass to stretch to a narrow neck so the glass can be severed or cut easily. After the glass is severed, the plug is raised from 1" to 6" above the top of the clay bushing and by this upward movement of the plug, the glass is entirely cleaned from the hole in the clay bushing, and also the small portions adhering to the plug after the cutting off takes place are drawn up into the body of molten glass into the channel and entirely eliminates the knife mark and eliminates chilled glass. On the next downward movement of the plug, the glass is clean and free from blisters. The height to which the plug is raised is determined by the quantity of glass required to make the different weight glassware. The shorter the stroke of the plug, the less glass you get. For example, if the plug is raised 3" and delivers 10 ounces of glass through a 2" hole in the clay bushing, then by raising the plug 6", 20 ounces of glass will be delivered through the 2" hole in the bushing. The bottom of section C on each side of the bushing 17 may be formed with a depression 50 leading to the central opening and forming ducts.

The knife 29, as illustrated in Figure 7, is bevelled at its cutting edge and is preferably made of cast iron and against this cutting edge is placed a blade of high speed tool steel 29ª held in place by countersunk screws, this steel at its edge having a ground face which bears against the ground face of the ring 20. The discharge opening through the ring is approximately 3½" in diameter under normal circumstances, and the knife 29 has a width of approximately 4", the knife being about 6" long and having a stroke of approximately 6".

In the operation of this invention, molten glass flows from the tank into the snout and keeps the snout filled to a predetermined level with molten glass, which is kept hot by the gas jets impinging against the baffle wall 14. If it be desired to permit a flow of molten glass from the snout, the plug 36 is raised by admitting air beneath the pistons 48 and this plug raised to an extent which will just permit the lower end of the plug to lift to allow the glass to flow downward into the space beneath the plug through the channels 50. As soon as the proper amount of glass has been allowed to flow the plug is depressed, thus forcing out the glass through the opening in the snout and at the same time the knife 29 is forced across the opening in the plate 18, thus cutting the glass cleanly off at this opening. As soon as this has been done, the knife is lowered to the position shown in Figure 3 and then retracted to its original position. By lowering the knife immediately after it has made its severing stroke and dropping it in order to make its return stroke, I avoid leaving any chill marks on the glass and also keep the glass above the knife from chilling so that the glass cannot be forced through the opening. By lowering the knife on making its return stroke, rapid wear of the knife is also eliminated, it being understood that the knife is retracted as soon as it is lowered.

Compressed air is preferably used for the purpose of operating the plug and operating the knife, but I do not wish to be limited to the use of compressed air or other motive fluid, as mechanical means might be used for the purpose, nor do I wish to be limited to the particular shape of the knife.

One of the particular advantages of my mechanism is due to the fact that the glass is delivered into the mold without coming in contact with any metal which would cause chill or cold marks to appear in the finished product. The only metal coming in contact with the glass is the cutting edge of the knife and the stream of glass with which the knife comes in contact is not more than 1/4" in diameter and drips from the conical point of the plug. Of course, it is understood that when molten glass comes in contact with iron or steel, it immediately chills and will not flow correctly. It will be seen from Figure 7 that the metal ring 20 is upwardly flared so that all but the upper corner of the opening through that ring is larger than the opening through the bushing 17. Thus, the glass does not contact with this ring. It will be understood, of course, that all of the cylinders 24, 33 and 47 are provided with two ports, one at each end, so that the cylinders are double acting cylinders controlled by motive pressure, the control of the fluid entering the cylinders being by means of a motor operated valve movement, not illustrated, and forming no part of the present invention.

I claim:—

1. In a glass furnace, a snout having a discharge opening in its bottom and an opening in its top in axial alignment with the discharge opening, and a plug controlling passage through the discharge opening disposed within the snout and extending upward through the second named opening, the lower end of the plug having a reduced portion fitting the discharge opening and providing a shoulder adapted to rest upon the material around the wall of the discharge opening, the lower face of the plug being conical.

2. In a glass furnace, a snout having a discharge opening in its bottom, a vertically movable plug controlling passage through the discharge opening, and means for raising or lowering the plug including cylinders disposed on each side of the snout, and pressure operated pistons disposed in said cylinders and having piston rods operatively connected at their upper ends to the plug.

3. In a glass furnace, a snout having a discharge opening in its bottom, a vertically movable plug controlling passage through the discharge opening and reduced in diameter at its lower end to fit the discharge opening and provide a shoulder adapted to rest upon the wall defining a discharge opening, and means for raising or lowering the plug, including cylinders disposed on each side of the snout, pressure operated pistons disposed in said cylinders and having piston rods operatively connected at their upper ends to the plug.

4. In a glass furnace, a snout having a discharge opening in its bottom, a vertically movable plug controlling passage through the discharge opening and reduced in diameter at its lower end to fit the discharge opening and provide a shoulder adapted to rest upon the wall defining a discharge opening, the plug being of refractory material, a cap clamping the upper end of the plug and having a transverse passage, a cross bar extending through said passage and with which the cap is engaged, cylinders disposed on each side of the snout, pressure operated pistons disposed in said cylinders and having piston rods operatively connected to the cross bar.

5. In a glass furnace, a snout having a discharge opening in its bottom, a vertically movable plug controlling passage through the discharge opening, the plug being of refractory material, a cap clamping the upper end of the plug and having a transverse passage, a cross bar extending through said passage and with which the cap is engaged, cylinders disposed on each side of the snout, and pressure operated pistons disposed in said cylinders and having piston rods operatively connected to the cross bar.

6. A glass furnace snout having a discharge opening in its bottom, a bushing of refractory, non-metallic material disposed within said opening, a metallic plate disposed against the bottom of the snout and having an opening coinciding with the opening in the bushing, said opening in the metallic plate at its upper end being slightly larger in diameter than the diameter of the opening in the bushing and flaring downward, and a vertically movable plug of refractory material disposed within the snout and reduced at its lower end to fit said discharge opening in the bushing and formed with a shoulder to rest upon the upper face of the bushing, the lower end of the plug being downwardly tapering to a point, and means for raising or lowering the plug.

7. A snout for glass furnaces formed of sections of refractory material, said sections being channel-shaped and the end section being formed with a double wall and having apertures whereby blasts of gas may be directed against the inner portion of said double wall to heat the contents of the snout, said end section being formed with a discharge opening, a channel-shaped top section having an opening in alignment with the bottom opening, and a plug controlling the discharge through the bottom opening and extending upward through the upper opening, said plug being vertically shiftable.

8. The combination with a glass furnace snout having a discharge opening, of a knife cutting off the glass discharge through the opening, and means for shifting the knife transversely across the opening and then lowering the knife away from the discharge opening and returning it to its initial position.

9. The combination with a glass furnace snout having a discharge opening, of a knife cutting off the glass projected from said opening, and manually controlled means for shifting the knife across the opening, then lowering the knife, then retracting the knife, and then raising it to its initial position.

10. The combination with a glass furnace having a discharge opening, of means for cutting off the glass at said discharge opening comprising a knife, a cylinder pivotally mounted for movement in a vertical plane and having a piston and piston rod, a knife pivotally mounted upon the piston rod and movable by the piston across the opening of the snout, a pivotally mounted, vertically disposed cylinder and a piston and piston rod therein, the piston rod being pivotally connected to the first named cylinder, and manually controlled means for controlling the passage of motive fluid into said cylinders to cause the projection and retraction of the piston in the first named cylinder and the vertical movement of the piston in the second named cylinder.

11. The combination with a glass furnace snout having a discharge opening in its bottom, of a base plate mounted upon the bottom and having an opening coinciding with the opening in the snout, ears extending downward from the base plate, a cylinder disposed approximately parallel to the plate and pivotally mounted between said ears, a piston therein having a forwardly projecting piston rod, a knife blade pivotally mounted upon said piston rod and adapted to slide against the face of the base plate and across the opening therein, a pivotally supported, vertically disposed cylinder having rocking movement in the same plane as the plane of movement of the first named piston rod, and a piston and piston rod therein, the piston rod being pivotally connected to the first named cylinder, and means for manually controlling passage of motive fluid to said cylinders to cause the projection or the retraction of the pistons therein.

12. The combination with a glass furnace snout having a discharge opening in its bottom, of a metallic base plate mounted upon the under face of the snout and having an opening coinciding with the opening in the bottom, a water cooled ring disposed in the base plate, a knife operating against the face of the base plate, and manually controlled means for shifting the knife in one direction across the face of the base plate to cut off the glass, then lower the knife, and then retract and raise the knife to its initial position.

13. The combination with a glass furnace snout having a discharge opening in its bottom, of a metallic base plate mounted upon the under face of the snout and having an opening coinciding with the opening in the bottom, a water cooled ring disposed in the base plate, a knife operating across the face of the base plate, and manually controlled means for shifting the knife in one direction across the face of the base plate to cut off the glass, then lower the knife, and then retract and raise the knife to its initial position, the under face of the ring being ground, and the knife blade at its extremity having a section of hard steel forming a cutting edge coacting with said ground face.

14. The combination with a glass furnace snout having a discharge opening, a vertically movable plug controlling passage through the discharge opening, the lower end of the plug being conical and terminating in a point, the apex of the conical end of the plug extending downward and being central with respect to the discharge opening, means for raising or lowering the plug, and a knife movable across the discharge opening immediately below the apex of the plug when the plug is lowered.

15. The combination with a glass furnace snout having a discharge opening, a vertically movable plug controlling passage through the discharge opening, the lower end of the plug being conical and terminating in a point, and means for raising or lowering the plug, and a knife moving across the axis of said discharge opening.

16. In a glass furnace snout having a discharge opening in its bottom, a metallic plate mounted upon the under face of the snout and having an opening coinciding with the opening in the bottom, a vertically movable plug disposed within the snout, reduced at its lower end to fit the discharge opening, the lower extremity of said plug being downwardly conical and terminating in a point, and a knife moving across the under face of the metallic plate and in its movement intersecting the axis of the discharge opening.

17. The combination with a glass furnace snout having a discharge opening in its bottom, of a base plate mounted upon the bottom and having an opening coinciding with the opening in the snout, a vertically movable plug disposed within the snout and reduced at its lower end to fit said discharge opening and having a downwardly tapering conical lower extremity, pressure operated means for raising and lowering the plug, a knife mounted upon the base plate for reciprocation across the axis of the discharge opening and against the base plate and slightly below the apex of the conical lower end of the plug, and means for reciprocating said knife.

18. The combination with a glass furnace snout having a discharge opening in its bottom, of a base plate mounted upon the bottom and having an opening coinciding with the opening in the snout, a vertically movable plug disposed within the snout and reduced at its lower end to fit said discharge opening and having a downwardly conical lower extremity, pressure operated means for raising and lowering the plug, a knife mounted upon the base plate for reciprocation across the axis of the discharge opening and against the base plate, and fluid operated means for shifting the knife in contact with the base plate and across the discharge opening to cut off the thread of glass depending from the conical extremity of the plug, then lowering the knife and retracting and raising it to its initial position.

19. The combination with a glass furnace snout having a discharge opening in its bottom, of an annular bushing of refractory material disposed in said discharge opening and through which the glass passes, a metallic plate in the bottom of the snout having an outwardly and downwardly flared opening larger than the opening of the bushing, means for cooling said plate, a vertically shiftable plug disposed within the snout and having its lower end reduced to form a portion fitting the lower end of the bushing, a shoulder above said bushing, adapted when the plug is lowered, to rest on the bushing and cut off the flow of glass therethrough, the lower end of the plug having the form of an inverted cone, and a knife disposed against the metallic plate and reciprocable across the axis of the opening therethrough and below the conical lower end of the plug when the latter is lowered to thereby cut off the thread of glass depending from the extremity of the plug when the plug is lowered.

In testimony whereof I hereunto affix my signature.

JOHN W. CARNAHAN.